(12) United States Patent
Kamakura et al.

(10) Patent No.: US 10,852,525 B2
(45) Date of Patent: Dec. 1, 2020

(54) BINOCULAR SYSTEM

(71) Applicant: KAMAKURA KOKI CO., LTD., Warabi (JP)

(72) Inventors: Toshiya Kamakura, Warabi (JP); Naomi Watanabe, Warabi (JP); Kazuki Shiraishi, Warabi (JP)

(73) Assignee: KAMAKURA KOKI CO., LTD., Saitama (JP)

( * ) Notice: Subject to any disclaimer, the term of this patent is extended or adjusted under 35 U.S.C. 154(b) by 120 days.

(21) Appl. No.: 16/151,065

(22) Filed: Oct. 3, 2018

(65) Prior Publication Data

US 2019/0113737 A1 Apr. 18, 2019

(30) Foreign Application Priority Data

Oct. 13, 2017 (JP) .................. 2017-199435

(51) Int. Cl.
*G02B 7/12* (2006.01)
*G02B 23/18* (2006.01)
(Continued)

(52) U.S. Cl.
CPC ............. *G02B 23/18* (2013.01); *G02B 23/02* (2013.01); *G02B 27/0081* (2013.01)

(58) Field of Classification Search
CPC .... G02B 23/02; G02B 23/18; G02B 27/0081; G02B 23/00; G02B 7/12; G02B 25/004; G02B 2027/0132
See application file for complete search history.

(56) References Cited

U.S. PATENT DOCUMENTS 2,573,560 A 10/1951 French
5,305,141 A * 4/1994 Hotta .................. G02B 23/18
359/415
(Continued)

FOREIGN PATENT DOCUMENTS

DE 43 11 366 C1 2/1994
JP 58-146208 U1 10/1983
JP 3126734 U 11/2006

OTHER PUBLICATIONS

Examiner provided machine translation of Rinn, DE 4311366 (Year: 1994).*

(Continued)

*Primary Examiner* — Balram T Parbadia
(74) *Attorney, Agent, or Firm* — Arent Fox LLP

(57) ABSTRACT

The binocular system 100 includes monoculars 10, 20 in pairs and a coupling portion 30 coupling the monoculars 10, 20 in pairs, wherein: one monocular 10 has a connecting portion 11 on a side of an objective lens 13 thereof; the other monocular 20 has a connected portion 22 connectable to the connecting portion 11 on a side of an eye lens 24 thereof; the coupling portion 30 includes a first coupling portion 31 formed integrally with the one monocular 10, a second coupling portion 32 formed integrally with the other monocular 20, and a hinge portion 33 coupling the first coupling portion 31 and the second coupling portion 32 in such a manner that a mutual bending angle therebetween is adjustable centering around a bending axis B; and the one monocular 10 and the other monocular 20 are detachable from each other.

15 Claims, 10 Drawing Sheets

(51) Int. Cl.
*G02B 23/02* (2006.01)
*G02B 27/00* (2006.01)

(56) References Cited

U.S. PATENT DOCUMENTS

| | | | | | |
|---|---|---|---|---|---|
| 5,583,693 | A | * | 12/1996 | Funatsu | G02B 7/06 |
| | | | | | 359/407 |
| 5,640,271 | A | * | 6/1997 | Nishitani | G02B 7/12 |
| | | | | | 359/407 |
| 6,172,808 | B1 | * | 1/2001 | Foreman | G02B 23/18 |
| | | | | | 351/158 |
| 2002/0023989 | A1 | * | 2/2002 | Ishikawa | G02B 23/18 |
| | | | | | 248/177.1 |
| 2005/0122581 | A1 | * | 6/2005 | Luthardt | G02B 23/18 |
| | | | | | 359/410 |
| 2012/0140322 | A1 | * | 6/2012 | Schnell | G02C 7/085 |
| | | | | | 359/481 |

OTHER PUBLICATIONS

Japanese Office Action of related Japanese Patent Application No. 2017-199436 dated Jul. 17, 2018.
Extended European Search Report of related European Patent Application No. 18200017.4 dated Apr. 2, 2019.

\* cited by examiner

[FIG. 1A]
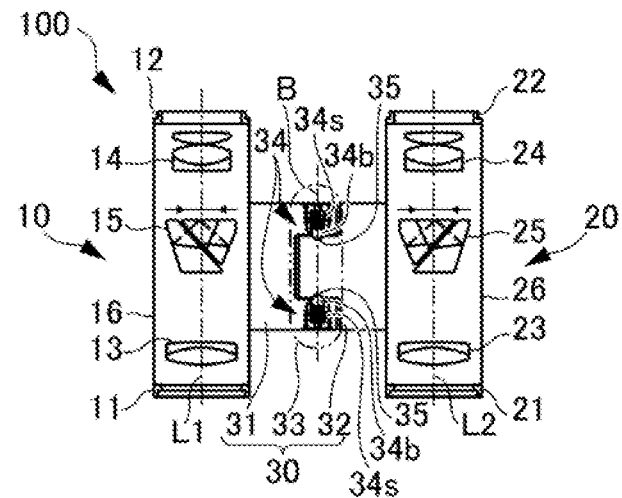
[FIG. 1B]
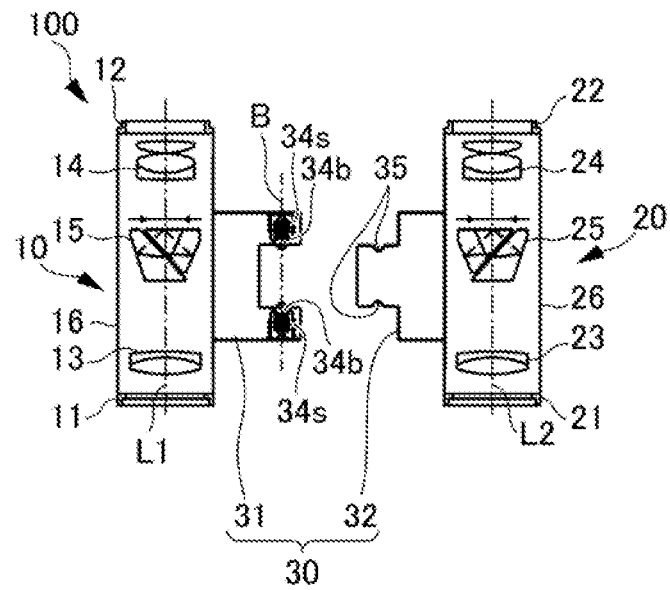

[FIG. 1C]
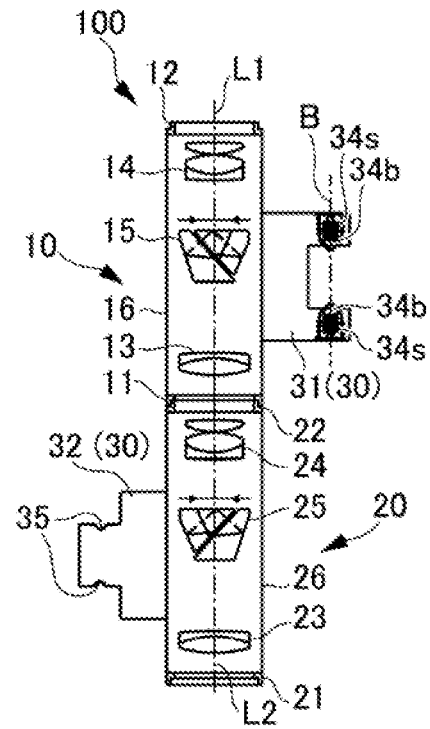
[FIG. 2]
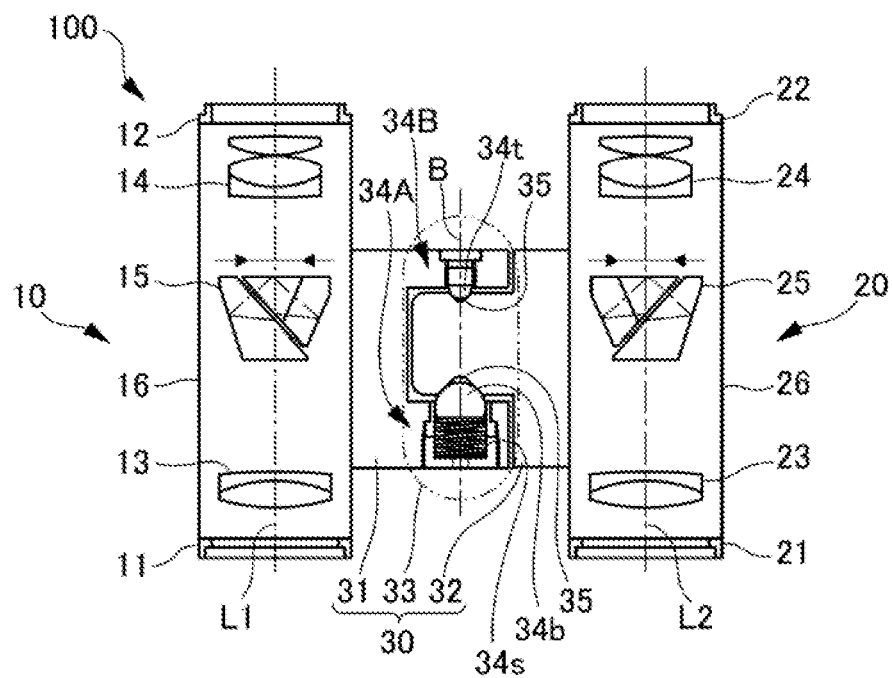

[FIG. 3]
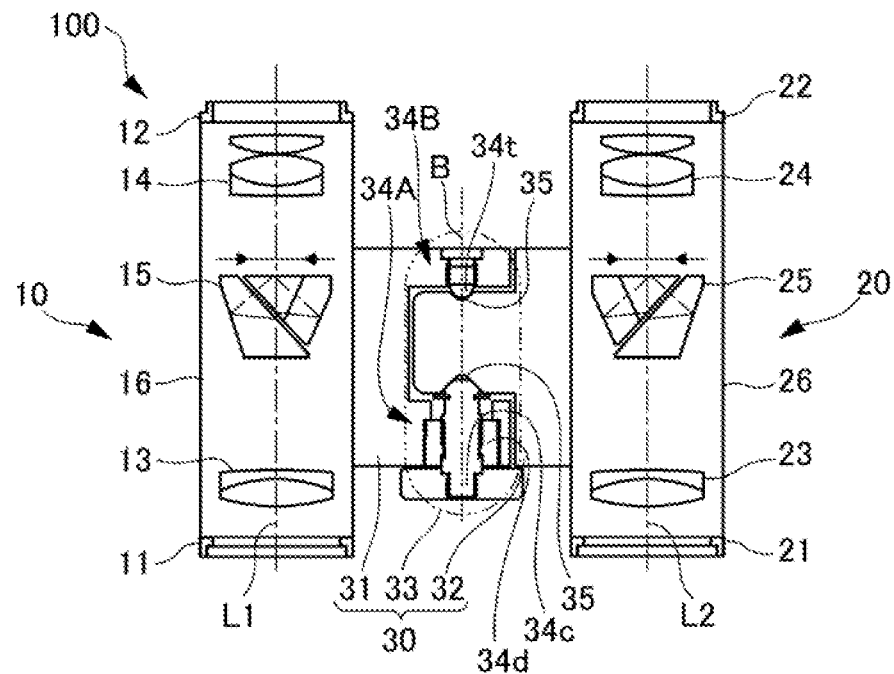
[FIG. 4]
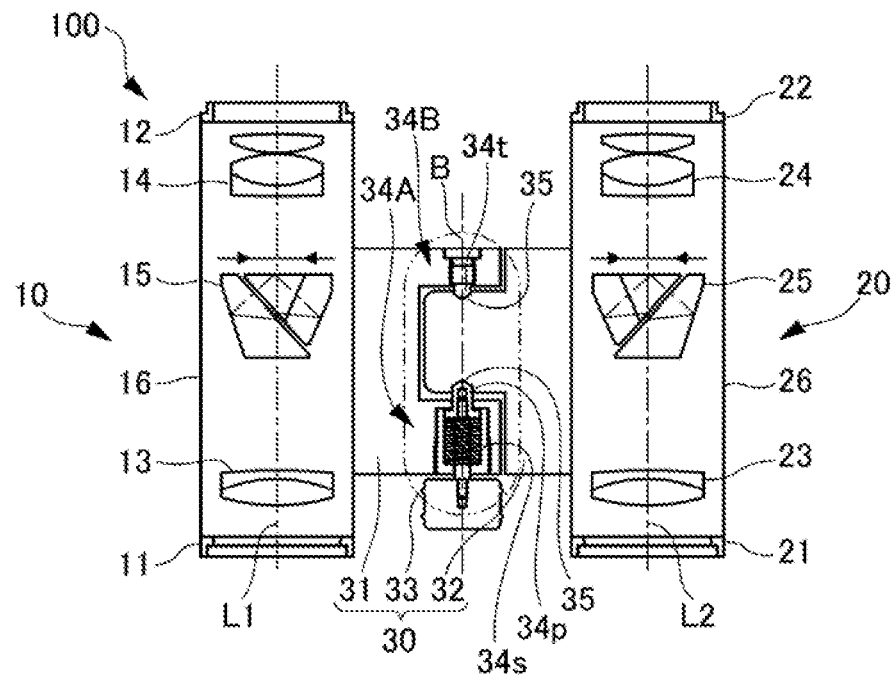

[FIG. 5A]
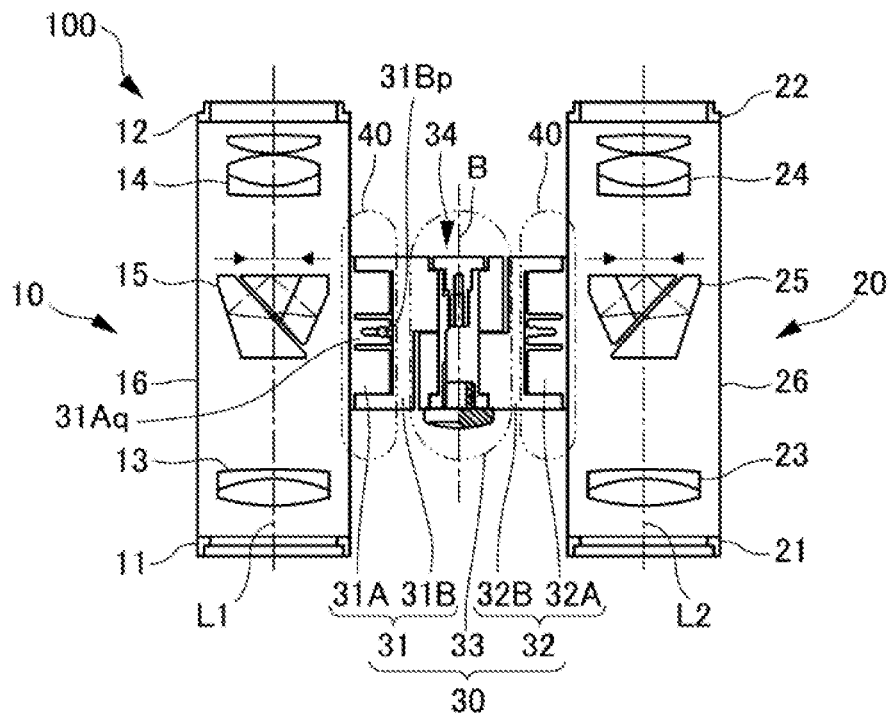
[FIG. 5B]
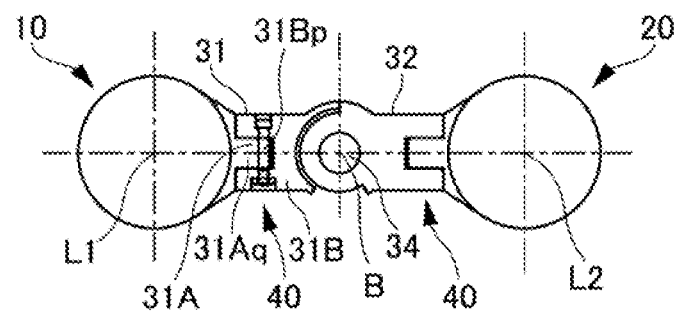

[FIG. 6A]
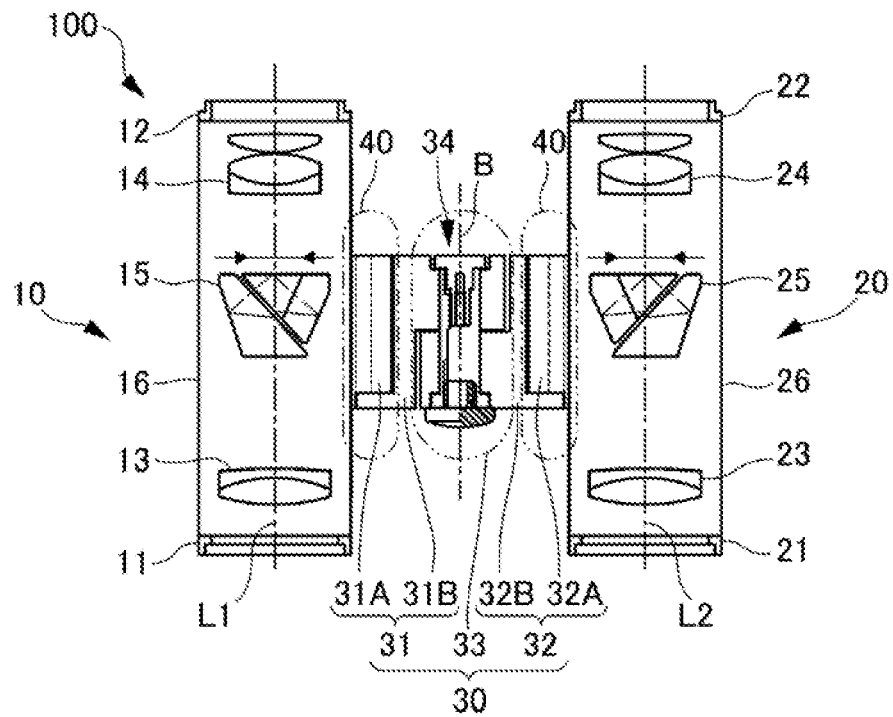
[FIG. 6B]
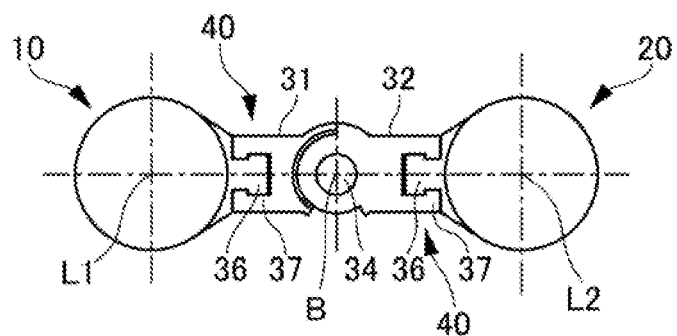

[FIG. 7A]
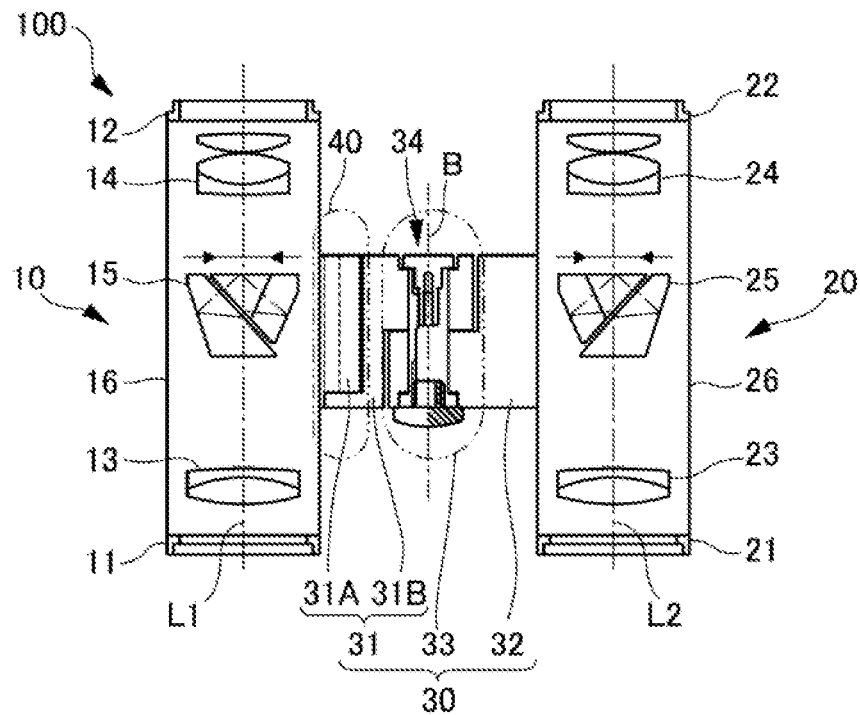
[FIG. 7B]
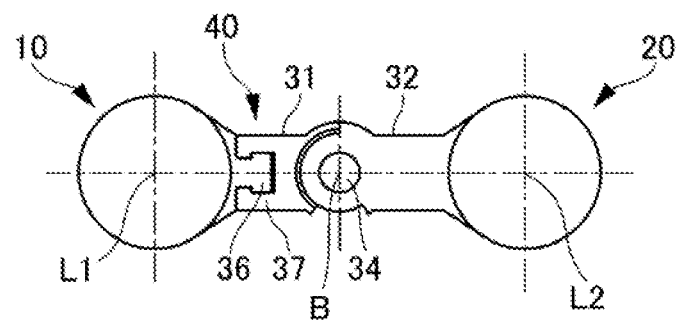

[FIG. 8]
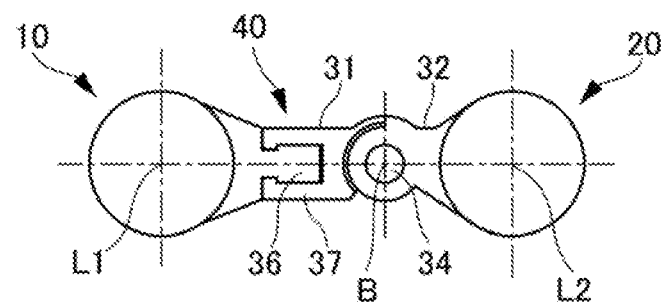
[FIG. 9]
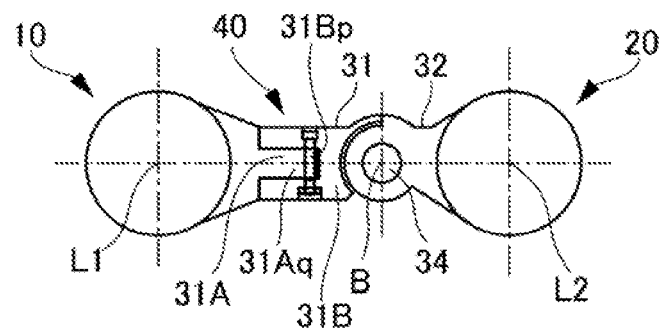

[FIG. 10]
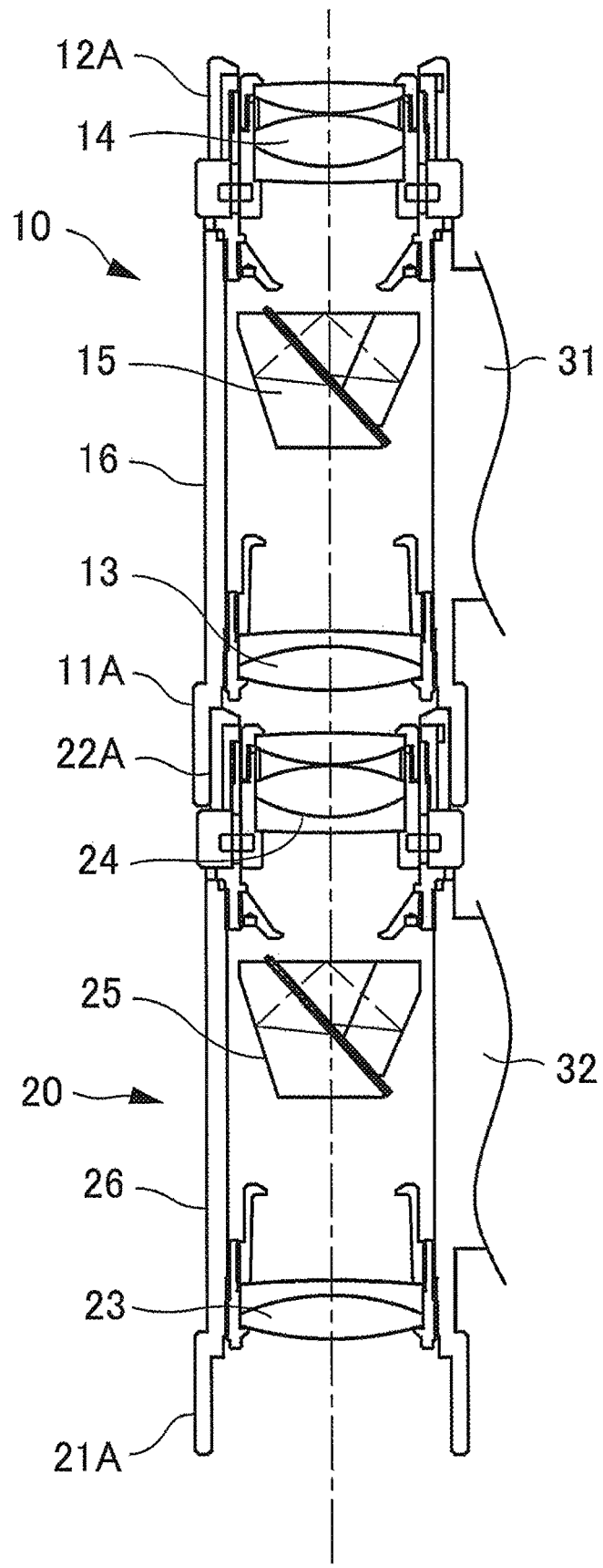

[FIG. 11]
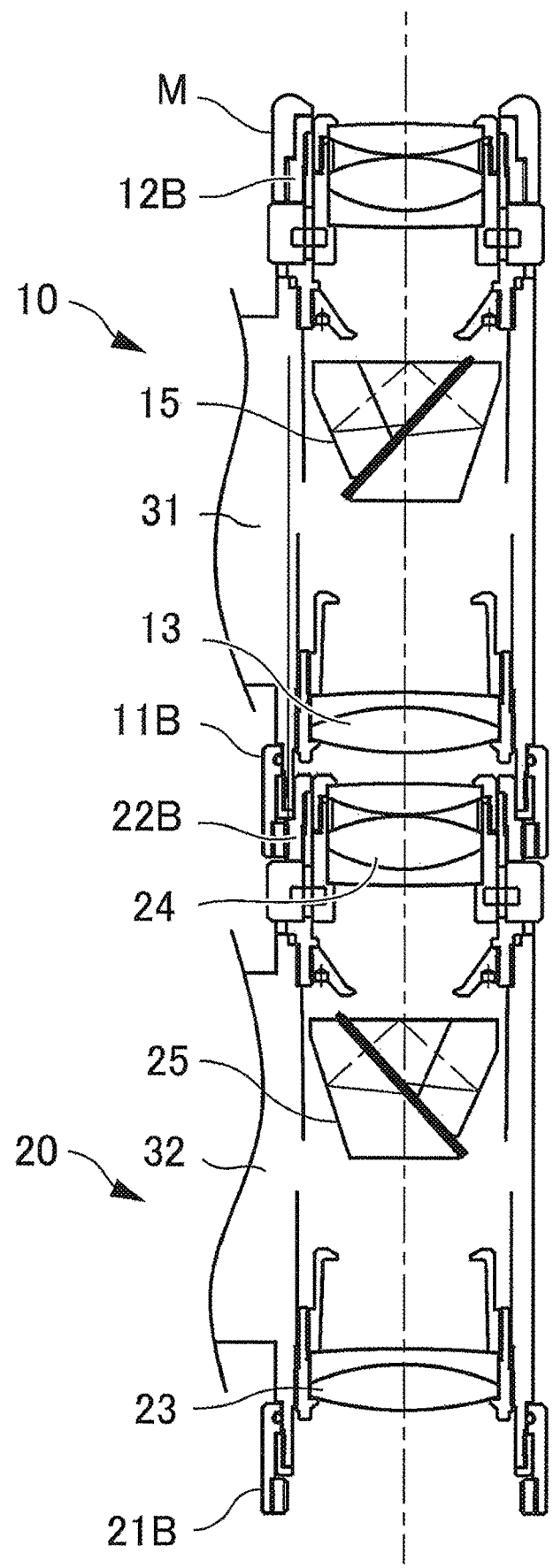

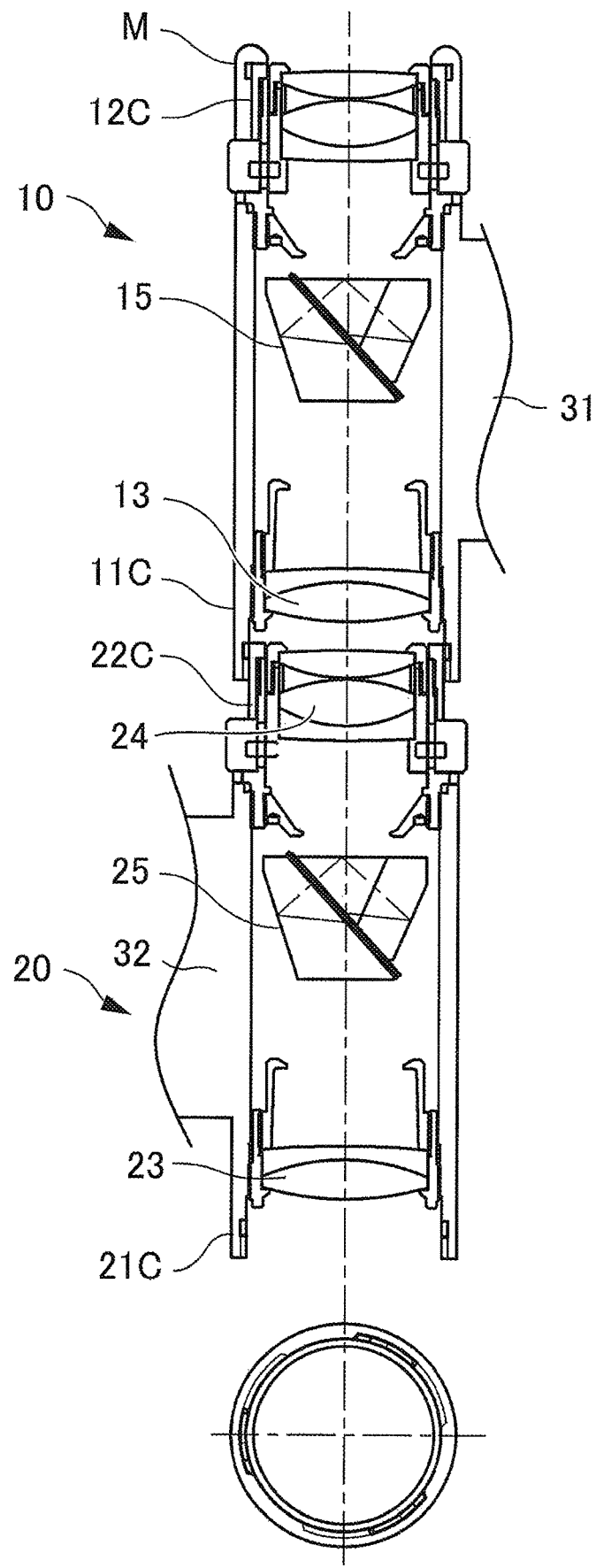
[FIG. 12]

BINOCULAR SYSTEM

CROSS-REFERENCE TO RELATED APPLICATIONS

This application claims priority to Japanese Patent Application No. 2017-199435 filed Oct. 13, 2017. The entire contents of the priority application is incorporated herein by reference.

TECHNICAL FIELD

The present invention relates to a binocular system.

BACKGROUND ART

Conventionally, known are a binocular system which includes monoculars in pairs removably received in a coupling member called a glasses body, and each monocular is provided with a connecting mechanism in which a side of an eye lens of one monocular and a side of an objective lens of the other monocular are connected (see, for example, Patent Document 1). Accordingly, the above binocular system can be used as a binocular system per se in usual, and then, if necessary, it can be used as a telescope with higher magnification by taking out the one monocular from the coupling member to connect it to the other monocular.

However, since this conventional binocular system requires the coupling member (the glasses body) independent from the monoculars in pairs, it is excessive in the number of parts, weight and size not only when used as a binocular system but even when used as a telescope, and consequently, that there is room for improvement thereof.

CITATION LIST

Patent Literature

Patent Literature 1: Japanese Unexamined Utility Model Application Publication No. 58-146208

SUMMARY OF INVENTION

Technical Problem

The present invention has been made in view of the above-mentioned problems, and it is an object of the present invention to provide a binocular system which has the number of parts reduced, becomes lightweight and compact, and is also usable as a telescope.

Solution to Problem

In order to achieve the above object, the present invention is grasped by the following configurations.

(1) A binocular system in accordance with an aspect of the present invention includes: monoculars in pairs; and a coupling portion coupling the monoculars in pairs, wherein: one monocular has a connecting portion on a side of an objective lens thereof; the other monocular has a connected portion connectable to the connecting portion on a side of an eye lens thereof; the coupling portion includes a first coupling portion formed integrally with the one monocular, a second coupling portion formed integrally with the other monocular, and a hinge portion coupling the first coupling portion and the second coupling portion in such a manner that a mutual bending angle therebetween is adjustable centering around a bending axis; and the one monocular and the other monocular are detachable from each other.

(2) In the configuration of the above (1), the hinge portion may have a shaft member movable forward and backward in a direction of the bending axis.

(3) In the above configuration (1) or (2), at least one of the first coupling portion and the second coupling portion may have a detachable separating portion.

Advantageous Effects of Invention

According to the present invention, it is possible to provide a binocular system which has the number of parts reduced, becomes lightweight and compact, and is also usable as a telescope.

BRIEF DESCRIPTION OF DRAWINGS

FIG. 1A is an explanatory diagram in planar view of a binocular system according to a first embodiment in a state that one monocular and the other monocular are coupled.

FIG. 1B is an explanatory diagram in planar view of the binocular system according to the first embodiment in a state that the one monocular and the other monocular are separated.

FIG. 1C is an explanatory diagram in planar view of the binocular system according to the first embodiment in a state that the one monocular and the other monocular are connected and fixed in a lengthwise continuous manner.

FIG. 2 is an explanatory diagram in planar view of a binocular system according to a second embodiment.

FIG. 3 is an explanatory diagram in planar view of a binocular system according to a third embodiment.

FIG. 4 is an explanatory diagram in planar view of a binocular system according to a fourth embodiment.

FIG. 5A is an explanatory diagram in planar view of a binocular system according to a fifth embodiment.

FIG. 5B is an explanatory diagram in front view of the binocular system according to the fifth embodiment.

FIG. 6A is an explanatory diagram in planar view of a binocular system according to a sixth embodiment.

FIG. 6B is an explanatory diagram in front view of the binocular system according to the sixth embodiment.

FIG. 7A is an explanatory diagram in planar view of a binocular system according to a seventh embodiment.

FIG. 7B is an explanatory diagram in front view of the binocular system according to the seventh embodiment.

FIG. 8 is an explanatory diagram in front view of a binocular system according to an eighth embodiment.

FIG. 9 is an explanatory diagram in front view of a binocular system according to a ninth embodiment.

FIG. 10 is an explanatory diagram in side view when a binocular system according to a tenth embodiment is used as a telescope.

FIG. 11 is an explanatory diagram in side view when a binocular system according to an eleventh embodiment is used as a telescope.

FIG. 12 is an explanatory diagram in side view when a binocular system according to a twelfth embodiment is used as a telescope.

DESCRIPTION OF EMBODIMENTS

First Embodiment

Hereinafter, a first embodiment to carry out the present invention is described in detail with reference to the accompanying drawings. It is noted that a binocular system 100 according to each of the first embodiment to a fourth embodiment as described below shows an example in which a hinge portion 33 is provided with a shaft member 34 movable forward and backward in a direction of a bending axis B. In the following description, unless otherwise specified, a direction that a user views an object through the binocular system 100, namely an up and down direction in FIG. 1, is defined as a forth and back direction.

FIGS. 1A to 1C are explanatory diagrams in planar view of the binocular system 100 according to the first embodiment. Individually, FIG. 1A shows a state that one monocular 10 and the other monocular 20 are coupled, FIG. 1B shows a state that the one monocular 10 and the other monocular 20 are separated, and FIG. 1C shows a state that the one monocular 10 and the other monocular 20 are connected and fixed in a lengthwise continuous manner.

As shown in FIGS. 1A, 1B and 1C, the binocular system 100 according to the first embodiment includes monoculars 10, 20 in pairs and a coupling portion 30 coupling the monoculars 10, 20 in pairs.

The monoculars 10, 20 in pairs are composed of the one monocular 10 and the other monocular 20. The one monocular 10 and the other monocular 20 are similarly structured. The one monocular 10 includes a cylindrical lens barrel 16 centering around an optical axis L1, and an eye lens 14, an erecting prism 15 and an objective lens 13 are arranged inside the lens barrel 16 in order from a user side toward an object side along the optical axis L1. The erecting prism 15 is preferably a roof prism capable of designing the optical axis L1 in a straight line so as to make a size of the lens barrel 16 compact, Similarly, the other monocular 20 includes a cylindrical lens barrel 26 centering around an optical axis L2, and an eye lens 24, an erecting prism 25 and an objective lens 23 are arranged inside the lens barrel 26 in order from the user side toward the object side along the optical axis L2. The erecting prism 25 is preferably a roof prism capable of designing the optical axis L2 in a straight line so as to make a size of the lens barrel 26 compact.

The one monocular 10 of the monoculars 10, 20 in pairs has a first connecting portion 11 (a connecting portion) on a side of the objective lens 13, and the other monocular 20 thereof has a first connected portion 22 (a connected portion) connectable to the first connecting portion 11 on a side of the eye lens 24. Additionally, in like manner, the other monocular 20 of the monoculars 10, 20 in pairs may have a second connecting portion 21 on a side of the objective lens 23 thereof, and the one monocular 10 may have a second connected portion 12 connectable to the second connecting portion 21 on a side of the eye lens 14 thereof.

The first connecting portion 11 and the first connected portion 22 are configured by, for example, a push-in joint (see FIG. 10), a screw joint (see FIG. 11) or a bayonet joint (see FIG. 12), so that they can be connected and fixed with no looseness by user's operation and can be released from connection with ease by user's operation. Accordingly, by separating the binocular system 100, as shown in FIG. 1B, into the one monocular 10 and the other monocular 20 with regard to the coupling portion 30, and then, by connecting the first connected portion 22 of the other monocular 20, as shown in FIG. 1C, to the first connecting portion 11 of the one monocular 10, the lens barrel 16 and the lens barrel 26 can be continuously arranged in a longitudinal direction so that the optical axis L1 and the optical axis L2 are in a straight line. Therefore, the one monocular 10 and the other monocular 20 can be connected and fixed in a lengthwise continuous manner. It is noted that the same effect can be also obtained by connecting the second connected portion 12 on the side of the eye lens 14 of the one monocular 10 to the second connecting portion 21 on the side of the objective lens 23 of the other monocular 20.

Further, by releasing such connection of the first connecting portion 11 and the first connected portion 22 in a state that the one monocular 10 and the other monocular 20 are connected and fixed in a lengthwise continuous manner (see FIG. 1C), the one monocular 10 and the other monocular 20 can be separated (see FIG. 1B). Then, by coupling the one monocular 10 and the other monocular 20 with the coupling portion 30 from a state that the one monocular 10 and the other monocular 20 are separated, the binocular system 100 in which the optical axis L1 and the optical axis L2 are arranged in a parallel manner can be obtained (See FIG. 1A).

As above, the user can use either the one monocular 10 or the other monocular 20 independently. In addition, the user can use them as a telescope with higher magnification (for example, 25 times) which is obtained by multiplying each magnification (for example, 5 times) in case that the one monocular 10 or the other monocular 20 is used independently, when looking at the object from the side of the eye lens 14 in a state that the one monocular 10 and the other monocular 20 are connected and fixed in a lengthwise continuous manner. Further, the user can use them as a magnifier, when looking at the object from the side of the objective lens 23 in a state that the one monocular 10 and the other monocular 20 are connected and fixed in a lengthwise continuous manner.

The coupling portion 30 has a first coupling portion 31 formed integrally with the one monocular 10, a second coupling portion 32 formed integrally with the other monocular 20, and a hinge portion 33 coupling the first coupling portion 31 and the second coupling portion 32 in such a manner that a mutual bending angle therebetween is adjustable centering around a bending axis B. The bending axis B is parallel to the optical axis L1 and the optical axis L2. Since the bending angle is adjustable, a distance between the optical axis L1 and the optical axis L2 can be matched with a pupil distance of the user. The first coupling portion 31 and the second coupling portion 32 are detachable from each other.

In this way, since the first coupling portion 31 and the second coupling portion 32 are detachable from each other, that is, the one monocular 10 and the other monocular 20 are detachable from each other, the one monocular 10 and the other monocular 20 can be separated to become respectively independent monoculars. Therefore, with one binocular system 100, two users can use respective monoculars simultaneously.

In addition, since the first coupling portion 31 formed integrally with the one monocular 10 and the second coupling portion 32 formed integrally with the other monocular 20 are detachable from each other, the one monocular 10 and the other monocular 20 can be detachable from each other without requiring a coupling member independent from the monoculars in pairs as conventional. Therefore, the binocular system 100 which has the number of parts reduced and becomes lightweight and compact can be obtained.

In detail, the first coupling portion 31 is formed integrally with the lens barrel 16 of the one monocular 10. The first coupling portion 31 is formed protruding in a lateral direction from an outer peripheral surface of the lens barrel 16 toward the other monocular 20. The first coupling portion 31 has bifurcated end portions which are in a substantially concave shape in planar view. The bifurcated end portions of the first coupling portion 31 are provided with shaft members 34, respectively, which function to allow the first coupling portion 31 and the second coupling portion 32 to be bendably coupled.

On the other hand, the second coupling portion 32 is formed integrally with the lens barrel 26 of the other monocular 20. The second coupling portion 32 is formed protruding in a lateral direction from an outer peripheral surface of the lens barrel 26 toward the one monocular 10. The second coupling portion 32 has an end portion as shaped to be fitted between the bifurcated end portions of the first coupling portion 31, which is in a substantially convex shape in planar view.

The hinge portion 33 has the shaft members 34 which are incorporated in the first coupling portion 31, respectively, and movable forward and backward in a direction of the bending axis B.

Each shaft member 34 has a ball 34b engageable with an engaged portion 35 which is a recess provided in the second coupling portion 32, and an elastic body 34s which is supported in the first coupling portion 31 while energizing the ball 34b toward the second coupling portion 32 in the direction of the bending axis B.

The second coupling portion 32 has at the end portion the engaged portions 35, 35 which are recesses engageable with the shaft members 34 provided at the bifurcated end portions of the first coupling portion 31, respectively.

Then, when the balls 34b in pairs are engaged with the engaged portions 35, 35 in pairs in a state that the end portion of the second coupling portion 32 is fitted between the bifurcated end portions of the first coupling portion 31, a state that the first coupling portion 31 and the second coupling portion 32 are coupled appears, that is, the binocular system 100 which is configured by coupling the one monocular 10 and the other monocular 20 is obtained.

Here, since the balls 34b in pairs are energized in a direction approaching to each other by the elastic bodies 34s in pairs, a state that the balls 34b in pairs are engaged with the engaged portions 35, 35 in pairs is maintained. The bending angle between the first coupling portion 31 and the second coupling portion 32 can be maintained at a desired angle by friction of the balls 34b in pairs with the engaged portions 35, 35 in pairs.

On the other hand, when force larger than a predetermined value is applied in a direction separating widthwise (right and left) the first coupling portion 31 and the second coupling portion 32 in a state that the first coupling portion 31 and the second coupling portion 32 are coupled, the balls 34b in pairs are disengaged from the engaged portions 35, 35 in pairs against energizing force of the elastic bodies 34s in pairs resulting in release of engagement. Therefore, the first coupling portion 31 and the second coupling portion 32 can be separated.

Second Embodiment

Next, a second embodiment to carry out the present invention is described in detail with reference to the accompanying drawings. In the binocular system 100 according to the second embodiment, the hinge portion 33 is different as compared with the binocular system 100 according to the first embodiment, and the others are in common. So, here, the hinge portion 33 is mainly described and explanations in common may be sometimes omitted.

FIG. 2 is an explanatory diagram in planar view of the binocular system 100 according to the second embodiment.

As shown in FIG. 2, the binocular system 100 according to the second embodiment includes the monoculars 10, 20 in pairs and the coupling portion 30 coupling the monoculars 10, 20 in pairs as well as the binocular system 100 according to the first embodiment.

The hinge portion 33 has a shaft member 34A movable forward and backward in the direction of the bending axis B and a shaft member 34B protruding toward the shaft member 34A along the bending axis B, wherein both are incorporated in the first coupling portion 31. The shaft member 34A has the ball 34b engageable with the engaged portion 35 which is a recess provided in the second coupling portion 32, and the elastic body 34s which is supported in the first coupling portion 31 while energizing the ball 34b toward the second coupling portion 32 in the direction of the bending axis B.

The shaft member 34B has a protruding portion 34t protruding toward the shaft member 34A along the bending axis B so as to be engageable with the engaged portion 35 which is a recess provided in the second coupling portion 32. In order to simplify assembling the shaft member 34B into the first coupling portion 31, for example, a male screw provided on an outer periphery of the shaft member 34B is screwed into a female screw provided on the first coupling portion 31 for mutual fixation.

The second coupling portion 32 has at the end portion the engaged portions 35, 35 which are recesses engageable with the shaft members 34A, 34B provided at the bifurcated end portions of the first coupling portion 31, respectively.

Then, when the protruding portion 34t of the shaft member 34B is engaged with one engaged portion 35 and the ball 34b of the shaft member 34A is engaged with the other engaged portion 35 in a state that the end portion of the second coupling portion 32 is fitted between the bifurcated end portions of the first coupling portion 31, a state that the first coupling portion 31 and the second coupling portion 32 are coupled appears, that is, the binocular system 100 which is configured by coupling the one monocular 10 and the other monocular 20 is obtained.

Here, since the ball 34b is energized in a direction facing toward the shaft member 34B by the elastic body 34s, a state that the protruding portion 34t is engaged with the one engaged portion 35 and a state that the ball 34b is engaged with the other engaged portion 35 are maintained, respectively.

The bending angle between the first coupling portion 31 and the second coupling portion 32 can be maintained at a desired angle by friction of the protruding portion 34t and the ball 34b with the engaged portions 35, 35 in pairs.

On the other hand, when the second coupling portion 32 is moved shiftedly in the direction of the bending axis B with respect to the first coupling portion 31 against energizing force of the elastic body 34s in a state that the first coupling portion 31 and the second coupling portion 32 are coupled, the protruding portion 34t is disengaged from the one engaged portion 35. Continuously, when the second coupling portion 32 is moved in a lateral direction (right and left) with respect to the first coupling portion 31, the ball 34b is disengaged from the other engaged portion 35 resulting in release of engagement. Therefore, the first coupling portion 31 and the second coupling portion 32 can be separated.

Third Embodiment

Next, a third embodiment to carry out the present invention is described in detail with reference to the accompanying drawings. In the binocular system 100 according to the third embodiment, the hinge portion 33 is different as compared with the binocular system 100 according to the first embodiment, and the others are in common. So, here, the hinge portion 33 is mainly described and explanations in common may be sometimes omitted.

FIG. 3 is an explanatory diagram in planar view of the binocular system 100 according to the third embodiment.

As shown in FIG. 3, the binocular system 100 according to the third embodiment includes the monoculars 10, 20 in pairs and the coupling portion 30 coupling the monoculars 10, 20 in pairs as well as the binocular system 100 according to the first embodiment.

The hinge portion 33 has the shaft member 34A protruding toward the shaft member 34B along the bending axis B and the shaft member 34B protruding toward the shaft member 34A along the bending axis B, wherein both are incorporated in the first coupling portion 31.

The shaft member 34A has a shaft 34c engageable at one end with the other engaged portion 35 which is a recess provided in the second coupling portion 32, and a female screw portion 34d to be screwed to the shaft 34c for fixation to the first coupling portion 31. The other end of the shaft 34c is provided with a head to make it easier for the user to turn the shaft 34c. A stopping member is provided on the one end of the shaft 34c to prevent the shaft 34c from coming out of the female screw portion 34d.

The shaft member 34B has the protruding portion 34t protruding toward the shaft member 34A along the bending axis B so as to be engageable with the one engaged portion 35 which is a recess provided in the second coupling portion 32.

The second coupling portion 32 has at the end portion the engaged portions 35, 35 which are recesses engageable with the shaft members 34A. 34B provided at the bifurcated end portions of the first coupling portion 31, respectively.

Then, when the protruding portion 34t of the shaft member 34B is engaged with the one engaged portion 35 and the one end of the shaft 34c of the shaft member 34A is engaged with the other engaged portion 35 in a state that the end portion of the second coupling portion 32 is fitted between the bifurcated end portions of the first coupling portion 31, a state that the first coupling portion 31 and the second coupling portion 32 are coupled appears, that is, the binocular system 100 which is configured by coupling the one monocular 10 and the other monocular 20 is obtained.

Here, since the shaft 34c is screwed into a female thread of the female screw portion 34d fixed to the first coupling portion 31 to be held by friction, a state that the protruding portion 34t is engaged with the one engaged portion 35 and a state that the shaft 34c is engaged with the other engaged portion 35 are maintained, respectively.

The bending angle between the first coupling portion 31 and the second coupling portion 32 can be maintained at a desired angle by friction of the protruding portion 34t and the shaft 34c with the engaged portions 35, 35 in pairs.

On the other hand, when the shaft 34c is turned in a direction disengaging the shaft 34c from the female screw portion 34d in a state that the first coupling portion 31 and the second coupling portion 32 are coupled, the shaft 34c is disengaged from the other engaged portion 35, and continuously, when the shaft 34c is further turned, the protruding portion 34t is disengaged from the one engaged portion 35. In this state, when the second coupling portion 32 is moved in a lateral direction (left and right) with respect to the first coupling portion 31, the first coupling portion 31 and the second coupling portion 32 can be separated since the first coupling portion 31 and the second coupling portion 32 are not engaged with each other Fourth Embodiment Next, a fourth embodiment to carry out the present invention is described in detail with reference to the accompanying drawings. In the binocular system 100 according to the fourth embodiment, the hinge portion 33 is different as compared with the binocular system 100 according to the first embodiment, and the others are in common. So, here, the hinge portion 33 is mainly described and explanations in common may be sometimes omitted.

FIG. 4 is an explanatory diagram in planar view of the binocular system 100 according to the fourth embodiment.

As shown in FIG. 4, the binocular system 100 according to the fourth embodiment includes the monoculars 10, 20 in pairs and the coupling portion 30 coupling the monoculars 10, 20 in pairs as well as the binocular system 100 according to the first embodiment.

The hinge portion 33 has the shaft member 34A protruding toward the shaft member 34B along the bending axis B and the shaft member 34B protruding toward the shaft member 34A along the bending axis B, wherein both are incorporated in the first coupling portion 31.

The shaft member 34A has a piston 34p provided with a pin engageable at one end with the other engaged portion 35 which is a recess provided in the second coupling portion 32, and the elastic body 34s energizing the piston 34p toward the other engaged portion 35. The piston 34p penetrates the elastic body 34s. The elastic body 34s is supported in the first coupling portion 31. The other end of the piston 34p is provided with a knob to make it easier for the user to move reciprocally the piston 34p.

The shaft member 34B has the protruding portion 34t protruding toward the shaft member 34A along the bending axis B so as to be engageable with the one engaged portion 35 which is a recess provided in the second coupling portion 32.

The second coupling portion 32 has at the end portion the engaged portions 35, 35 which are recesses engageable with the shaft members 34A. 34B provided at the bifurcated end portions of the first coupling portion 31, respectively.

Then, when the protruding portion 34t of the shaft member 34B is engaged with the one engaged portion 35 and the one end of the piston 34p of the shaft member 34A is engaged with the other engaged portion 35 in a state that the end portion of the second coupling portion 32 is fitted between the bifurcated end portions of the first coupling portion 31, a state that the first coupling portion 31 and the second coupling portion 32 are coupled appears, that is, the binocular system 100 which is configured by coupling the one monocular 10 and the other monocular 20 is obtained.

Here, since the piston 34p is energized by the elastic body 34s which is supported in the first connecting portion 31, a state that the protruding portion 34t is engaged with the one engaged portion 35 and a state that the piston 34p is engaged with the other engaged portion 35 are maintained, respectively.

The bending angle between the first coupling portion 31 and the second coupling portion 32 can be maintained at a desired angle by friction of the protruding portion 34t and the piston 34p with the engaged portions 35, 35 in pairs.

On the other hand, when the knob is pulled in a direction separating the piston 34p from the first coupling portion 31 in a state that the first coupling portion 31 and the second coupling portion 32 are coupled, the pin at the one end of the piston 34p is disengaged from the other engaged portion 35, and continuously, when the knob is further pulled, the protruding portion 34t is disengaged from the one engaged portion 35. In this state, when the second coupling portion 32 is moved in a lateral direction (left and right) with respect to the first coupling portion 31, the first coupling portion 31 and the second coupling portion 32 can be separated since the first coupling portion 31 and the second coupling portion 32 are not engaged with each other.

Fifth Embodiment

Next, a fifth embodiment to carry out the present invention is described in detail with reference to the accompanying drawings. In the binocular system 100 according to the fifth embodiment, the coupling portion 30 is different as compared with the binocular system 100 according to the first embodiment, and the others are in common. So, here, the coupling portion 30 is mainly described and explanations in common may be sometimes omitted. It is noted that the binocular system 100 according to each of the fifth embodiment to a ninth embodiment as described below shows an example in which the coupling portion 30 is detachably provided with a separating portion 40.

FIG. 5A is an explanatory diagram in planar view of the binocular system 100 according to the fifth embodiment, and FIG. 5B is an explanatory diagram in front view of the binocular system 100 according to the fifth embodiment.

As shown in FIGS. 5A and 5B, the binocular system 100 according to the fifth embodiment includes the monoculars 10, 20 in pairs and the coupling portion 30 coupling the monoculars 10, 20 in pairs as well as the binocular system 100 according to the first embodiment.

The coupling portion 30 has the first coupling portion 31 formed integrally with the one monocular 10, the second coupling portion 32 formed integrally with the other monocular 20, and the hinge portion 33 coupling the first coupling portion 31 and the second coupling portion 32 in such a manner that a mutual bending angle is adjustable centering around the bending axis B.

Here, at least one of the first coupling portion 31 and the second coupling portion 32 has the separating portion 40 as detachably provided. By means of the separating portion 40, the one monocular 10 and the other monocular 20 are detachable. Since at least one of the first coupling portion 31 and the second coupling portion 32 has the separating portion 40 as detachably provided, and then, both are detachable from each other in the separating portion 40, the one monocular 10 and the other monocular 20 can be separated to become respectively independent monoculars. Therefore, with the binocular system 100, two users can use respective monoculars simultaneously.

In addition, since the at least one of the first coupling portion 31 formed integrally with the one monocular 10 and the second coupling portion 32 formed integrally with the other monocular 20 has the separating portion 40, the one monocular 10 and the other monocular 20 can be detachable from each other without requiring a coupling member independent from the monoculars in pairs as conventional. Therefore, the binocular system 100 which has the number of parts reduced and becomes lightweight and compact can be obtained.

In detail, the first coupling portion 31 is formed integrally with the lens barrel 16 of the one monocular 10. The first coupling portion 31 is formed protruding in a lateral direction from the outer peripheral surface of the lens barrel 16 toward the other monocular 20. The first coupling portion 31 is in a substantially stairs shape in planar view. The first coupling portion 31 has a lens barrel side portion 31A formed integrally with the lens barrel 16 and a hinge side portion 31B detachable via the separating portion 40 with respect to the lens barrel side portion 31A.

Similarly, the second coupling portion 32 is formed integrally with the lens barrel 26 of the other monocular 20. The second coupling portion 32 is formed protruding in a lateral direction from the outer peripheral surface of the lens barrel 26 toward the one monocular 10. The second coupling portion 32 is in a substantially stairs shape by making the first coupling portion 31 inverted symmetrically in a front and back direction (symmetrically in an up and down direction in FIG. 5) in planar view. The second coupling portion 32 has a lens barrel side portion 32A formed integrally with the lens barrel 26 and a hinge side portion 32B detachable via the separating portion 40 with respect to the lens barrel side portion 32A.

Since the separating portion 40 of the first coupling portion 31 and the separating portion 40 of the second coupling portion 32 are almost similarly structured, the separating portion 40 of the first coupling portion 31 is described in detail on behalf. The lens barrel side portion 31A has a convex portion insertable into a concave portion provided in the hinge side portion 31B, and the hinge side portion 31B has the concave portion having a shape corresponding to a shape of the convex portion of the lens barrel side portion 31A. The lens barrel side portion 31A and the hinge side portion 31B are removable from each other. The barrel side portion 31A has an elastic slit portion 31Aq provided with tongue pieces in pairs between which an engaging pin 31Bp of the hinge side portion 31B is engageable by frictional force caused by being clamped therebetween. On the other hand, the hinge side portion 31B has the engaging pin 31Bp in a rod shape to be clamped in the elastic slit portion 31Aq. Therefore, by inserting the convex portion of the lens barrel side portion 31A into the concave portion of the hinge side portion 31B, and at the same time, by clamping the engaging pin 31Bp in the elastic slit portion 31Aq, the lens barrel side portion 31A and the hinge side portion 31B can be fixed with each other. In addition, by removing the engaging pin 31Bp from the elastic slit portion 31Aq, they can be separated from each other. Additionally, the separating portion 40 may be provided on at least one of the first coupling portion 31 and the second coupling portion 32, that is, on both of the first coupling portion 31 and the second coupling portion 32, or on only one of the first coupling portion 31 and the second coupling portion 32.

The hinge portion 33 has the shaft member 34 which is incorporated in the first coupling portion 31 and the second coupling portion 32 to be arranged along the direction of the bending axis B. The shaft member 34 may not be detachable with respect to the first coupling portion 31 and the second coupling portion 32, and it may be formed in a divided manner in order to simplify assembling.

The shaft member 34 fastens the first coupling portion 31 and the second coupling portion 32. In addition, by adjusting fastening force of the shaft member 34, frictional force between the first coupling portion 31 and the second coupling portion 32 becomes adjustable. Then, the bending angle between the first coupling portion 31 and the second coupling portion 32 can be maintained at a desired angle by friction of the first coupling portion 31 with the second coupling portion 32.

Sixth Embodiment

Next, a sixth embodiment to carry out the present invention is described in detail with reference to the accompanying drawings. The binocular system 100 according to each of the sixth embodiment to the ninth embodiments is different as compared with the binocular system 100 according to the fifth embodiment regarding the separating portion 40, and the others are in common. So, here, the separating portion 40 is mainly described and explanations in common may be sometimes omitted. It is noted that the binocular system 100 according to each of the fifth embodiment to the ninth embodiment shows an example in which the coupling portion 30 is detachably provided with the separating portion 40.

FIG. 6A is an explanatory diagram in planar view of the binocular system 100 according to the sixth embodiment, and FIG. 6B is an explanatory diagram in front view of the binocular system 100 according to the sixth embodiment.

As shown in FIGS. 6A and 6B, at least one of the first coupling portion 31 and the second coupling portion 32 has the separating portion 40 as detachably provided. Here, both of the first coupling portion 31 and the second coupling portion 32 have the separating portions 40 as detachably provided, for example. By means of the separating portions 40, the one monocular 10 and the other monocular 20 are detachable. In this way, since at least one of the first coupling portion 31 and the second coupling portion 32 has the separating portion 40 as detachably provided, and then, both are detachable from each other in the separating portion 40, the one monocular 10 and the other monocular 20 can be separated to become respectively independent monoculars. Therefore, with the binocular system 100, two users can use respective monoculars simultaneously.

In detail, the separating portion 40 is a so-called dovetail joint in which a dovetail tenon 36 formed in the lens barrel side portion 31A is fitted into a dovetail groove 37 formed in the hinge side portion 31B. Additionally, the dovetail groove 37 may be formed in the barrel side portion 31A and the dovetail tenon 36 may be formed in the hinge side portion 31B. In the separating portion 40, one or both of the dovetail groove 37 and the dovetail tenon 36 is/are provided with a taper along a longitudinal direction. Then, when the dovetail tenon 36 is slidably fitted into the dovetail groove 37 in a front and back direction (an up and down direction in FIG. 6) from a state that the lens barrel side portion 31A and the hinge side portion 31B are separated, the dovetail groove 37 and the dovetail tenon 36 are tightened and fixed to each other. The lens barrel side portion 31A and the hinge side portion 311B can be separated by sliding them in a reverse direction.

Seventh Embodiment

Next, a seventh embodiment to carry out the present invention is described in detail with reference to the accompanying drawings.

FIG. 7A is an explanatory diagram in planar view of the binocular system 100 according to the seventh embodiment, and FIG. 7B is an explanatory diagram in front view of the binocular system 100 according to the seventh embodiment.

As shown in FIGS. 7A and 78, at least one of the first coupling portion 31 and the second coupling portion 32 has the separating portion 40 as detachably provided. Here, only one of the first coupling portion 31 and the second coupling portion 32 has the separating portion 40, for example. By means of the separating portion 40, the one monocular 10 and the other monocular 20 are detachable. In this way, since at least one of the first coupling portion 31 and the second coupling portion 32 has the separating part 40 as detachably provided, and then, both are detachable from each other in the separating portion 40, the one monocular telescope 10 and the other monocular 20 can be separated to become respectively independent monoculars. Therefore, with the binocular system 100, two users can use respective monoculars simultaneously.

Eighth Embodiment

Next, an eighth embodiment to carry out the present invention is described in detail with reference to the accompanying drawings.

FIG. 8 is an explanatory diagram in front view of the binocular system 100 according to the eighth embodiment.

As shown in FIG. 8, at least one of the first coupling portion 31 and the second coupling portion 32 has the separating portion 40 as detachably provided. By means of the separating part 40, the one monocular 10 and the other monocular 20 are detachable. In this way, since at least one of the first coupling portion 31 and the second coupling portion 32 has the separating portion 40 as detachably provided, and then, both are detachable from each other in the separating portion 40, the one monocular 10 and the other monocular 20 can be separated to become respectively independent monoculars. Therefore, with the binocular system 100, two users can use respective monoculars simultaneously.

Ninth Embodiment

Next, the ninth embodiment to carry out the present invention is described in detail with reference to the accompanying drawings.

FIG. 9 is an explanatory diagram in front view of the binocular system 100 according to the ninth embodiment.

As shown in FIG. 9, the separation portion 40 is similar to the separation portion 40 according to the fifth embodiment and is provided in the first coupling portion 31. The bending axis B is set at a position eccentric from the middle between the optical axis L1 of the one monocular 10 and the optical axis L2 of the other monocular 20. More specifically, with respect to the middle between the optical axis L1 and the optical axis L2, such eccentric position is set on a side (a side of the other monocular 20) opposite to a side (a side of the one monocular 10) on which the separating portion 40 is located. As a result, as compared with a case where the bending axis B is set on the middle between the optical axis L1 and the optical axis L2, the center of gravity can be brought closer to the middle between the optical axis L1 and the optical axis L2. Also, the weight of the one monocular 10 and the weight of the other monocular 20 can become close when they are independently separated into the one monocular 10 and the other monocular 20 at the separating portion 40. Therefore, the binocular system 100 becomes better in weight balance and improved in feeling of use in either case when used as a binocular system, when used as a telescope, or when used as a monocular.

Tenth Embodiment

Next, a tenth embodiment to carry out the present invention is described in detail with reference to the accompanying drawings. The tenth embodiment to a twelfth embodiment as described below show specific examples of the first connecting portion 11 (a connecting portion) and the first connected portion 22 (a connected portion) when the binocular system 100 is used as a telescope.

FIG. 10 is an explanatory diagram in side view when the binocular system 100 according to the tenth embodiment is used as a telescope. As shown in FIG. 1C, the one monocular 10 has a first connecting portion 11A (a connecting portion) on the side of the objective lens 13, and the other monocular 20 has a first connected portion 22A (a connected portion) connectable to the first connecting portion 11A on the side of the eye lens 24. Additionally, the one monocular 10 may have a second connected portion 12A (a connected portion) on the side of the eye lens 14, and the other monocular 20 may have a second connecting portion 21A (a connecting portion) connectable to the second connected portion 12A on the side of the objective lens 23. Then, by connecting the first connected portion 22A of the other monocular 20 to the first connecting portion 11A of the one monocular 10, the lens barrel 16 and the lens barrel 26 are continuously arranged in a longitudinal direction so that the optical axis L1 and the optical axis L2 are in a straight line. Therefore, the one monocular 10 and the other monocular 20 are connected and fixed in a lengthwise continuous manner.

Here, as shown in FIG. 10, the first connecting portion 11A and the first connected portion 22A are configured by a push-in joint. Specifically, the first connecting portion 11A and the first connected portion 22A are, for example, elastic bodies made of resin. The first connecting portion 11A and the first connected portion 22A are formed in cylindrical shape. In addition, an outer diameter of the first connected portion 22A is set slightly larger than an inner diameter of the first connecting portion 11A. By inserting the first connected portion 22A into the first connecting portion 11A to be fitted in a mutually tightened state, a state that the one monocular 10 and the other monocular 20 are connected in a lengthwise continuous manner is maintained. Further, when force larger than a predetermined value is applied in a direction separating the first connecting portion 11A and the first connected portion 22A from each other, the first connecting portion 11A and the first connected portion 22A can be separated. Additionally, the second connected portion 12A and the second connecting portion 21A may be similarly configured. Also, a male-to-female relationship between the first connecting portion 11A and the first connected portion 22A may be reversed. In this manner, the one monocular 10 and the other monocular 20 can be connected and fixed with no looseness by user's operation and this connection can be released with ease by user's operation.

Eleventh Embodiment

Next, an eleventh embodiment to carry out the present invention is described in detail with reference to the accompanying drawings.

FIG. 11 is an explanatory diagram in side view when the binocular system 100 according to the eleventh embodiment is used as a telescope.

As shown in FIG. 11, unlike the tenth embodiment, a first connecting portion 11B and a first connected portion 22B are configured by a screw joint. Specifically, for example, the first connecting portion 11B has a male screw thereon and the first connected portion 22B has a female screw thereon. By screwing the male screw of the first connected portion 22B in a right direction into the female screw of the first connecting portion 11B to be fixed in a mutually screwed state, a state that the one monocular 10 and the other monocular 20 are connected in a lengthwise continuous manner is maintained. Further, when the first connected portion 22B is turned in a reverse direction with respect to the first connecting portion 11B, the first connecting portion 11B and the first connected portion 22B can be separated. Additionally, the second connected portion 12B and the second connecting portion 21B may be similarly configured. Also, a male-to-female relationship between the first connecting portion 11B and the first connected portion 22B may be reversed. The second connected portion 12B may be provided with a repositionable eyecup M having a female screw screwable to a male screw of the second connected portion 12B. In this manner, the one monocular 10 and the other monocular 20 can be connected and fixed with no looseness by user's operation and this connection can be released with ease by user's operation.

Twelfth Embodiment

Next, the twelfth embodiment to carry out the present invention is described in detail with reference to the accompanying drawings.

FIG. 12 is an explanatory diagram in side view when the binocular system 100 according to the twelfth embodiment is used as a telescope.

As shown in FIG. 12, unlike the tenth embodiment and the eleventh embodiment, the first connecting portion 11C and the first connected portion 22C are configured by a bayonet joint. Specifically, for example, the first connected portion 22C is a male side and the first connecting portion 11C is a female side. Then, by parallelly moving the first connecting portion 11C and the first connected portion 22C in a direction approaching to each other in a state that a phase of a slit on the female side of the first connecting portion 11C and a phase of a projecting portion on the male side of the first connected portion 22C are aligned, and then, by rotating them, a state that the one monocular 10 and the other monocular 20 are connected in a lengthwise continuous manner is maintained. Further, when the first connected portion 22C is rotated in a reverse direction with respect to the first connecting portion 11C, and then, the first connecting portion 11C and the first connected portion 22C are parallelly moved apart from each other, the first connecting portions 11C and the first connected portion 22C can be separated. Additionally, the second connected portion 12C and the second connecting portion 21C may be similarly configured. Also, a male-to-female relationship between the first connecting portion 11C and the first connected portion 22C may be reversed. The second connected portion 12C may be provided with the repositionable eyecup M engageable with the male side of the second connected portion 12C. In this manner, the one monocular 10 and the other monocular 20 can be connected and fixed with no looseness by user's operation and this connection can be released with ease by user's operation.

Although the present invention has been described with reference to the embodiments as above, it is needless to say that the technical scope of the present invention is not limited to the scope described in the above embodiments. It is obvious to those skilled in the art that various modifications or improvements can be added to the above embodiments. Further, it is obvious from the features described in the claims that any embodiment in which such modifications or improvements are added can also be included in the technical scope of the present invention. For example, it is possible to combine appropriately a configuration according to any one of the first to ninth embodiments, in which the one monocular 10 and the other monocular 20 are detachably coupled, and a configuration according to any one of the tenth to twelfth embodiments, in which a connecting portion is provided on the side of the objective lens 13 of the one monocular 10 and a connected portion is provided on the side of the eye lens 24 of the other monocular 20.

The binocular system 100 of the present invention includes the monoculars 10, 20 in pairs and the coupling portion 30 of coupling the monoculars 10, 20 in pairs, wherein: the one monocular 10 has the connecting portion 11 on the side of an objective lens 13 thereof; the other monocular 20 has the connected portion 22 connectable to the connecting portion 11 on the side of the eye lens 24 thereof; the coupling portion 30 includes the first coupling portion 31 formed integrally with the one monocular 10, the second coupling portion 32 formed integrally with the other monocular 20, and the hinge portion 33 coupling the first coupling portion 31 and the second coupling portion 32 in such a manner that a mutual bending angle therebetween is adjustable centering around the bending axis B; and the one monocular 10 and the other monocular 20 are detachable from each other. Consequently, it is possible to provide the binocular system 100 which has the number of parts reduced, becomes lightweight and compact, and is also usable as a telescope.

REFERENCE SIGNS LIST

10: one monocular
11: first connecting portion (connecting portion)
11A: first connecting portion
11B: first connecting portion
11C: first connecting portion
12: second connected portion
12A: second connected portion
12B: second connected portion
12C: second connected portion
13: objective lens
14: eye lens
15: erecting prism
16: lens barrel
20: the other monocular
21: second connecting portion
21A: second connecting portion
21B: second connecting portion
21C: second connecting portion
22: first connected portion (connected portion)
22A: first connected portion
22B: first connected portion
22C: first connected portion
23: objective lens
24: eye lens
25: erecting prism
26: lens barrel
30: coupling portion
31: first coupling portion
31A: lens barrel side portion
31Aq: elastic slit portion
31B: hinge side portion
31Bp: engaging pin
32: second coupling portion
32A: lens barrel side portion
32B: hinge side portion
33: hinge portion
34: shaft member
34A: shaft member
34b: ball
34B: shaft member
34c: shaft
34d: female screw portion
34p: piston
34s: elastic body
34t: protruding portion
35: engaged portion
36: dovetail tenon
37: dovetail groove
40: separating portion
100: binocular system
B: bending axis
L1: optical axis
L2: optical axis
M: eyecup

The invention claimed is:

1. A binocular system comprising:
monoculars in pairs; and
a coupling portion coupling the monoculars in pairs,
wherein:
one monocular has a connecting portion on a side of an objective lens thereof;
the other monocular has a connected portion connectable to the connecting portion on a side of an eye lens thereof;
the coupling portion includes a first coupling portion formed integrally with the one monocular, a second coupling portion formed integrally with the other monocular, and a hinge portion coupling the first coupling portion and the second coupling portion in such a manner that a mutual bending angle therebetween is adjustable centering around a bending axis; and
the one monocular and the other monocular are detachable from each other,
wherein the hinge portion has a shaft member movable forward and backward in a direction of the bending axis, the shaft member being provided at one of the first coupling portion and the second coupling portion, and
wherein the other one of the first coupling portion and the second coupling portion has at least one engaged portion which is a recess engageable with the shaft member.

2. The binocular system according to claim 1,
wherein the shaft member includes an engaging member engageable with the engaged portion, and an elastic body energizing the engaging member toward the engaged portion in the direction of the bending axis.

3. The binocular system according to claim 2,
wherein the engaging member is a ball or a piston.

4. The binocular system according to claim 2,
wherein the engaging member is a piston provided with a pin engageable with the engaged portion at one end of the piston and a knob at the other end of the piston for reciprocally moving the piston in the direction of the bending axis.

5. The binocular system according to claim 1,
wherein the shaft member includes a piston provided with a pin engageable with the engaged portion at one end of the piston and a knob at the other end of the piston for reciprocally moving the piston in the direction of the bending axis.

6. The binocular system according to claim 1,
wherein the shaft member includes
a shaft engageable with the engaged portion at one end of the shaft,
a female screw portion fixed in the one of the first coupling portion and the second coupling portion to be screwed to the shaft, and
a head provided at the other end of the shaft for turning the shaft.

7. The binocular system according to claim 1,
wherein the shaft member is provided to extend on the bending axis.

8. The binocular system according to claim 1,
wherein the one of the first coupling portion and the second coupling portion has bifurcated end portions forming a concave portion, and
wherein the other one of the first coupling portion and the second coupling portion has a convex shaped end portion as shaped to be fitted between the bifurcated end portions of the one of the first coupling portion and the second coupling portion, the recess being formed at the convex shaped end portion.

9. The binocular system according to claim 8,
wherein the hinge portion includes a pair of the shaft members respectively provided to penetrate the bifurcated end portions, and
wherein the other one of the first coupling portion and the second coupling portion has a pair of the recesses respectively engageable with the shaft members.

10. A binocular system comprising:
monoculars in pairs; and
a coupling portion coupling the monoculars in pairs,
wherein:
one monocular has a connecting portion on a side of an objective lens thereof;
the other monocular has a connected portion connectable to the connecting portion on a side of an eye lens thereof;
the coupling portion includes a first coupling portion formed integrally with the one monocular, a second coupling portion formed integrally with the other monocular, and a hinge portion coupling the first coupling portion and the second coupling portion in such a manner that a mutual bending angle therebetween is adjustable centering around a bending axis; and
the one monocular and the other monocular are detachable from each other,
wherein one of the first coupling portion and the second coupling portion has a lens barrel side portion formed integrally with a lens barrel of respective one of the pair of monoculars and a hinge side portion detachable from the lens barrel side portion such that the lens barrel side portion and the hinge side portion form a detachable separating portion, and
wherein the bending axis is set at a position eccentric from the middle between an optical axis of the one monocular and an optical axis of the other monocular on a side opposite to a side on which the separating portion is located.

11. The binocular system according to claim 10,
wherein the lens barrel side portion has a convex portion provided with an elastic slit portion, and the hinge side portion has a concave portion, having a shape corresponding to a shape of the convex portion of the lens barrel side portion, provided with an engaging pin in a rod shape to be clamped in the elastic slit portion of the lens barrel side portion.

12. The binocular system according to claim 10,
wherein one of the lens barrel side portion and the hinge side portion has a dovetail tenon and the other of the lens barrel side portion and the hinge side portion has a dovetail groove engageable with the dovetail tenon, at least one of the dovetail tenon and the dovetail groove being provided with a taper along a longitudinal direction.

13. A binocular system comprising:
monoculars in pairs; and
a coupling portion coupling the monoculars in pairs,
wherein:
one monocular has a connecting portion on a side of an objective lens thereof;
the other monocular has a connected portion connectable to the connecting portion on a side of an eye lens thereof;
the coupling portion includes a first coupling portion formed integrally with the one monocular, a second coupling portion formed integrally with the other monocular, and a hinge portion coupling the first coupling portion and the second coupling portion in such a manner that a mutual bending angle therebetween is adjustable centering around a bending axis; and
the one monocular and the other monocular are detachable from each other,
wherein each of the first coupling portion and the second coupling portion has a lens barrel side portion formed integrally with a lens barrel of respective one of the pair of monoculars and a hinge side portion detachable from the lens barrel side portion in such a manner that the lens barrel side portion and the hinge side portion form a detachable separating portion.

14. The binocular system according to claim 13,
wherein the lens barrel side portion has a convex portion provided with an elastic slit portion, and the hinge side portion has a concave portion, having a shape corresponding to a shape of the convex portion of the lens barrel side portion, provided with an engaging pin in a rod shape to be clamped in the elastic slit portion of the lens barrel side portion.

15. The binocular system according to claim 13,
wherein in each of the first coupling portion and the second coupling portion, one of the lens barrel side portion and the hinge side portion has a dovetail tenon and the other of the lens barrel side portion and the hinge side portion has a dovetail groove engageable with the dovetail tenon, at least one of the dovetail tenon and the dovetail groove being provided with a taper along a longitudinal direction.

* * * * *